United States Patent [19]

Katagiri et al.

[11] Patent Number: 4,579,799
[45] Date of Patent: Apr. 1, 1986

[54] PHOTOCONDUCTIVE FILM ELECTROPHOTOGRAPHIC PHOTOSENSITIVE MEMBER THEREWITH

[75] Inventors: Kazuharu Katagiri; Yoshihiro Oguchi, both of Yokohama; Yoshio Takasu, Tama, all of Japan

[73] Assignee: Canon Kabushiki Kaisha, Tokyo, Japan

[21] Appl. No.: 690,900

[22] Filed: Jan. 14, 1985

[30] Foreign Application Priority Data

Jan. 17, 1984 [JP] Japan .................. 59-6196

[51] Int. Cl.⁴ .................. G03G 5/06; G03G 5/09
[52] U.S. Cl. .................. 430/58; 430/72; 430/74; 430/76; 430/95; 430/128
[58] Field of Search .................. 430/72, 74, 73, 76

[56] References Cited

PUBLICATIONS

Journal Am. Chem. Soc., 1958, pp. 1110–1117; 1960, pp. 494–501.

*Primary Examiner*—John D. Welsh
*Attorney, Agent, or Firm*—Fitzpatrick, Cella, Harper & Scinto

[57] ABSTRACT

A photoconductive film comprises an azulenium salt represented by the general formula (1)

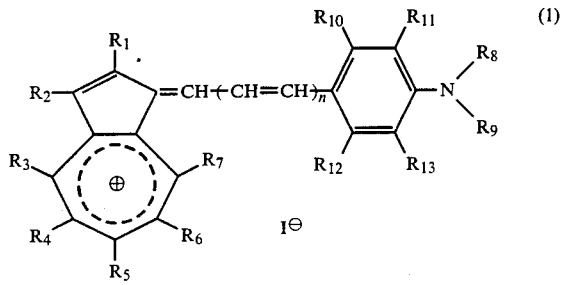

wherein $R_1$, $R_2$, $R_3$, $R_4$, $R_5$, $R_6$, and $R_7$ are each independently hydrogen, halo or a monovalent organic residue; or at least one of the combinations of $R_1$ with $R_2$, $R_3$ with $R_4$, $R_4$ with $R_5$, $R_5$ with $R_6$, and $R_6$ with $R_7$ may form an unsubstituted or substituted aromatic ring; $R_8$ and $R_9$ are each independently unsubstituted or substituted alkyl, aryl, or aralkyl; or $R_8$ and $R_9$, together with the nitrogen atom to which they are attached, may be joined to form an aromatic ring; $R_{10}$, $R_{11}$, $R_{12}$, and $R_{13}$ are each independently hydrogen, halo, alkyl, alkoxy, or hydroxyl; and n is 0, 1, or 2.

14 Claims, 1 Drawing Figure

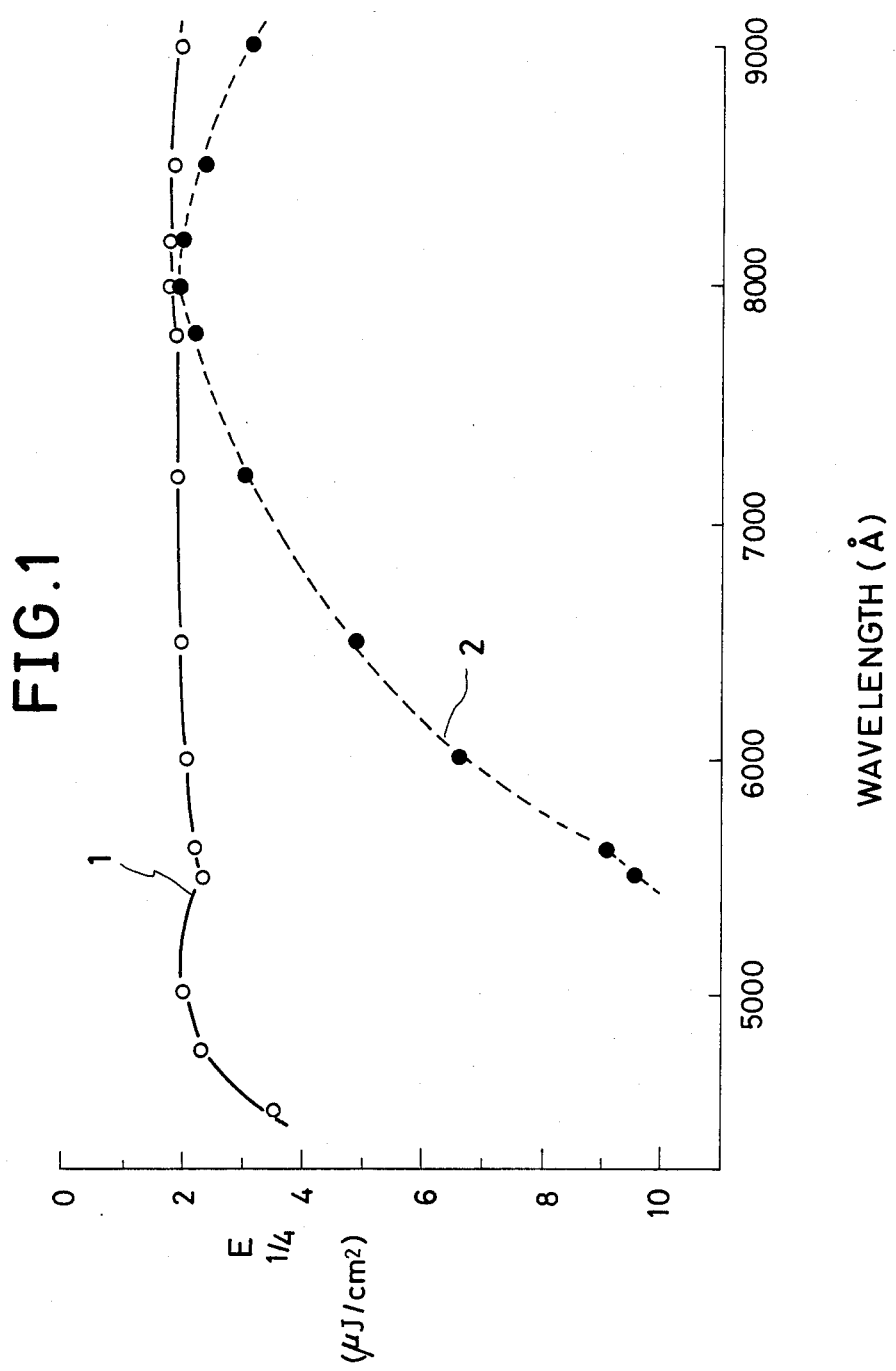

PHOTOCONDUCTIVE FILM ELECTROPHOTOGRAPHIC PHOTOSENSITIVE MEMBER THEREWITH

BACKGROUND OF THE INVENTION

1. Field of the Invention

The present invention relates to a novel photoconductive film and an electrophotoconductive member with high and panchromatic sensitivity utilizing such a film.

2. Description of the Prior Art

Up to now a great number of reports have been presented on photoconductive pigments or dyes.

For instance, "RCA Review", Vol. 23, pp. 413-419 (1962.9) describes photoconductivity of phthalocyanine pigments, and electrophotographic photosensitive members utilizing these pitments are disclosed in U.S. Pat. Nos. 3,397,086 and 3,816,118. Besides these, the following pigments and dyes, for example, are disclosed as organic semiconductors for use in electrophotographic photosensitive members. That is; pyrylium dyes as disclosed in U.S. Pat. Nos. 4,315,983 and 4,327,169 and "Research Disclosure" 20517 (1981.5); squaric acid methine dyes as disclosed in U.S. Pat. No. 3,824,099; and dis-azo pigments as disclosed in U.S. Pat. Nos. 3,898,084 and 4,251,613.

These organic semiconductors have advantages over inorganic ones in that the former is easy to synthesize and from the former a compound having a desired spectral sensitivity can be chosen, and in that electrophotographic photosensitive members provided with films of such organic semiconductors on conductive substrates exhibit improved color sensitivity. However, the hitherto found organic semiconductors are not much satisfactory in sensitivity and panchromatic property. In particular, existing organic and inorganic semiconductors are sensitive only to rays of shorter wavelengths (e.g. 350-500 nm), rays of longer wavelengths (e.g. 600-750 nm), or rays of intermediate wavelentgths (e.g. 500-600 nm); that is, no panchromatic semiconductor has been found out that exhibits sensitivity throughout the whole region ranging from the shorter wavelength region to the longer wavelength region.

Accordingly electrophotographic photosensitive members hitherto used in color copying machines have been supplied with panchromatic sensitivity by incorporating, for example, a blue, green, or red sensitizer into the photosensitive layer. Such photosensitive members, however, have drawbacks in that the sensitizer is faded by light irradiation in the image exposure and in the charge elimination or static-image erasing and this causes the disappearance of the desired panchromatic sensitivity during a long term service, and in particular few red sensitizers show good properties. Thus no photosensitive member satisfactory in panchromatic property has been obtained.

SUMMARY OF THE INVENTION

In view of the above, the present inventors made intensive studies, and as a result have found that unexpected panchromatic sensitivity can be attained by using a certain azulenium salt having an iodide anion ($I^\ominus$).

Accordingly objects of the invention are to provide a novel photoconductive film having high and panchromatic sensitivity and to provide a panchromatic electrophotographic photosensitive member having such a film.

These objects of the invention are achieved with a photoconductive film comprising an azulenium salt represented by the following general formula (1) and with an electrophotographic photosensitive member having said film.

General formula (1):

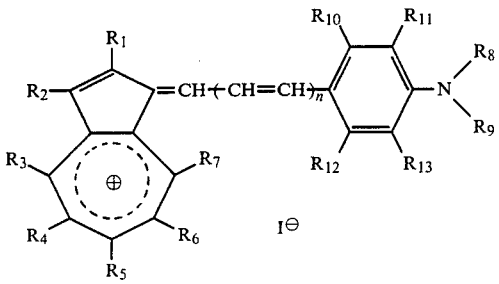

wherein $R_1$, $R_2$, $R_3$, $R_4$, $R_5$, $R_6$, and $R_7$ are each independently hydrogen, halo or a monovalent organic residue; or at least one of the combinations of $R_1$ with $R_2$, $R_3$ with $R_4$, $R_4$ with $R_5$, $R_5$ with $R_6$, and $R_6$ with $R_7$ may form a substituted or unsubstituted aromatic ring; $R_8$ and $R_9$ are each independently substituted or unsubstituted alkyl, aryl, or aralkyl; or $R_8$ and $R_9$, together with the nitrogen atom to which they are attached, may be joined to form a ring; $R_{10}$, $R_{11}$, $R_{12}$, and $R_{13}$ are each independently hydrogen, halo, alkyl, alkoxy, or hydroxyl; and n represents 0, 1, or 2.

BRIEF DESCRIPTION OF THE DRAWING

FIG. 1 is a graph showing spectral sensitivities of respective photosensitive members prepared in Example 1 and in Comparative Example 1 herein given.

DETAILED DESCRIPTION OF THE INVENTION

In formula (1) representing azulenium salts used in the embodiment of this invention, symbols have the following meaning.

$R_1$ through $R_7$ each represent hydrogen or halo (e.g. chloro, bromo, or iodo) or a monovalent organic residue. The monovalent organic residue can be selected from a wide variety of radicals. Preferred examples of this residue are alkyl groups (e.g. methyl, ethyl, n-propyl, isopropyl, n-butyl, tert-butyl, n-amyl, n-hexyl, n-octyl, 2-ethylhexyl, and tert-octyl), alkoxy groups (e.g. methoxy, ethoxy, propoxy, and butoxy), substituted or unsubstituted aryl groups (e.g. phenyl, tolyl, xylyl, ethylphenyl, methoxyphenyl, ethoxyphenyl, chlorophenyl, nitrophenyl, dimethylaminophenyl, α-naphthyl, and β-naphthyl), substituted or unsubstituted aralkyl groups (e.g. benzyl, 2-phenylethyl, 2-phenyl-1-methylethyl, bromobenzyl, 2-bromophenylethyl, methylbenzyl, methoxybenzyl, and nitrobenzyl), acyl groups (e.g. acetyl, propionyl, butyryl, valeryl, benzoyl, toluoyl, naphtoyl, phthaloyl, and furoyl), substituted or unsubstituted amino groups (e.g. amino, dimethylamino, diethylamino, dipropylamino, acetylamino, and benzoylamino), substituted or unsubstituted styryl groups (e.g. styryl, dimethylaminostyryl, diethylaminostyryl, dipropylaminostyryl methoxystyryl, ethoxystyryl, and methylstyryl), nitro group, hydroxyl group, carboxyl group, cyano group, and substituted or unsubstituted arylazo groups (e.g. phenylazo, α-naphthylazo, β-naphthylazo, dimethylaminophenylazo, chlorophenylazo, nitrophenylazo, methoxyphenylazo, and torylazo). But at least one of the combinations of $R_1$ with $R_2$, $R_3$ with $R_4$, $R_4$ with $R_5$, $R_5$ with $R_6$, and $R_6$ with $R_7$ may form a substituted or unsubstituted aromatic ring (e.g. benzene, naphthalene, chlorobenzene, bromobenzene, methylbenzene, ethylbenzene, methoxybenzene, or ethoxybenzene).

$R_8$ and $R_9$ each represent alkyl group (e.g. methyl, ethyl, n-propyl, isopropyl, n-butyl, tert-butyl, n-amyl, n-hexyl, n-octyl, 2-ethylhexyl, or tert-octyl), substituted or unsubstituted aryl group (e.g. phenyl, tolyl, xylyl, ethylphenyl, chlorophenyl, nitrophenyl, methoxyphenyl, ethoxyphenyl, α-naphthyl, or β-naphthyl), or substituted or unsubstituted aralkyl group (e.g. benzyl, 2-phenylethyl, 2-phenyl-1-methylethyl, methylbenzyl, methoxybenzyl, or nitrobenzyl). $R_8$ and $R_9$, cojointly with the nitrogen atom, may form a 5- or 6-membered ring residue (e.g. morpholino, pyrrolidinyl, piperidino, piperadino, phenothiazino, phthenoxazino, carbazolyl, indolyl, pyrrolyl, or pyrazolyl).

$R_{10}$, $R_{11}$, $R_{12}$, and $R_{13}$ each represent hydrogen, alkyl group (e.g. methyl, ethyl, n-propyl, isopropyl, n-butyl, tert-butyl, n-hexyl, 2-ethylhexyl, tert-octyl, or n-octyl), alkoxy group (e.g. methoxy, ethoxy, propoxy, or butoxy), halo, or hydroxyl group.

The letter n represents an integer of 0, 1, or 2.

Typical Examples of the azulenium salt used in the invention are given below.

(1)
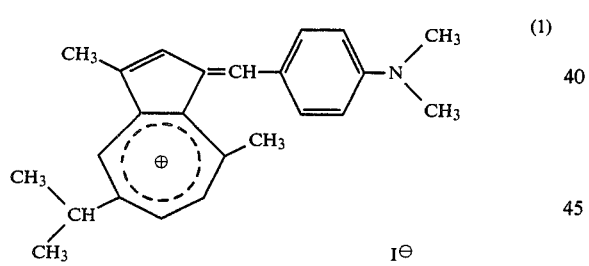

(2)
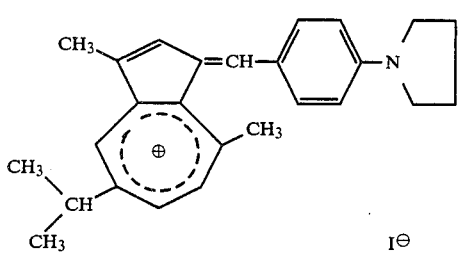

(3)

(4)
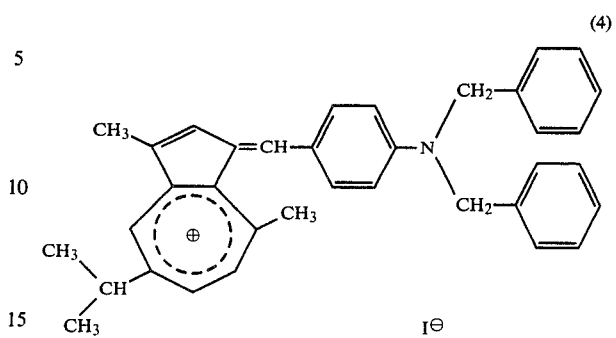

(5)
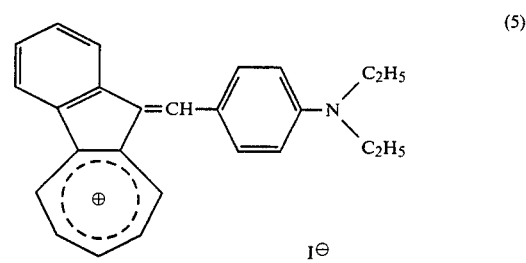

(6)
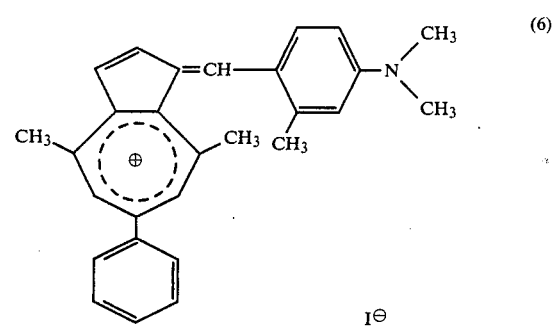

(7)
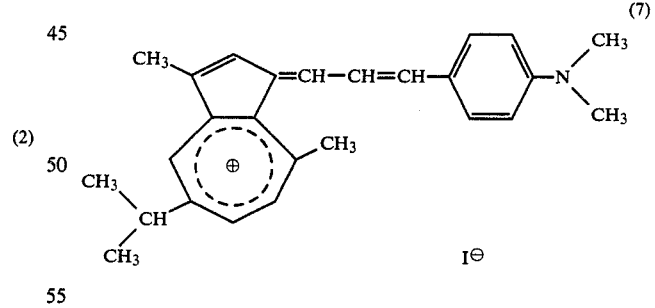

(8)
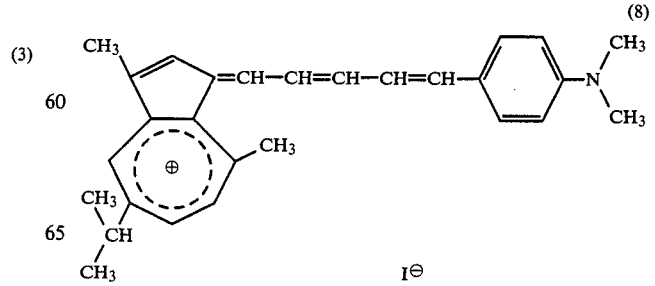

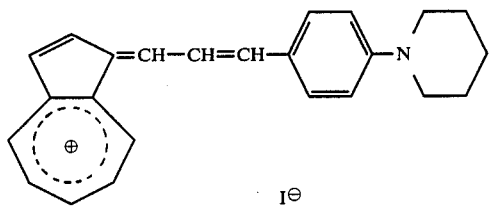 (9)

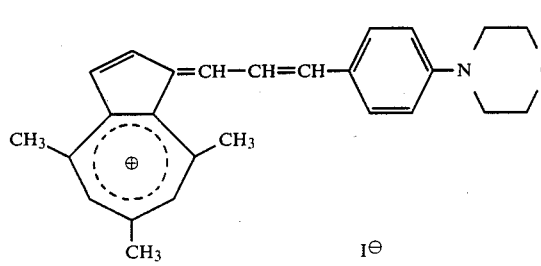 (10)

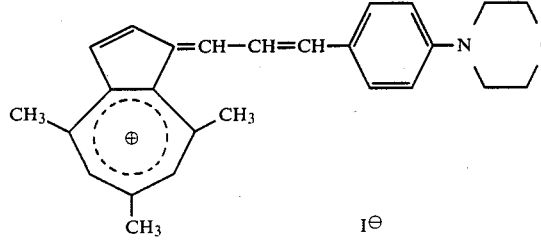 (11)

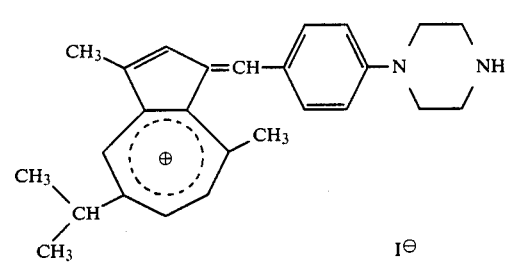 (12)

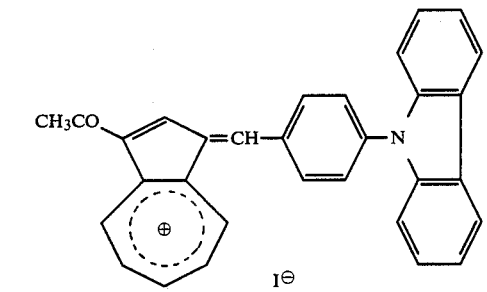 (13)

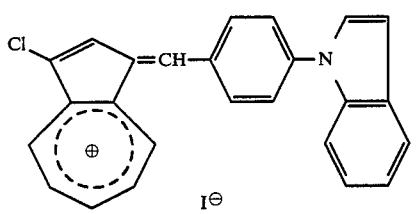 (14)

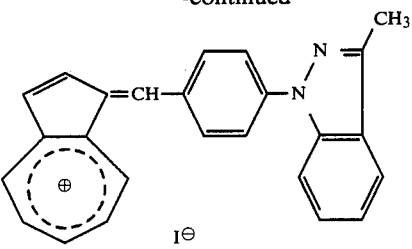 (15)

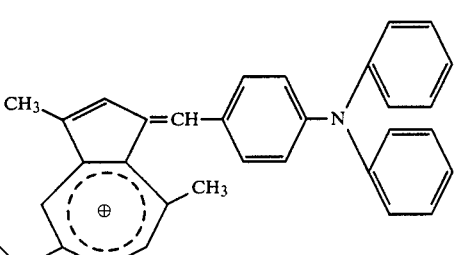 (16)

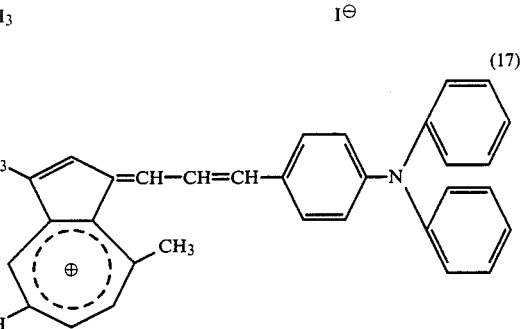 (17)

As is described in Journal of the Chemical Society, 1958, pp. 1110–1117, ibid., 1960, pp. 494–501, and ibid., 1961, pp. 3579–3593, the azulenium salt represented by formula (1) is prepared by mixing the azulene compound and the corresponding aldehyde in a suitable solvent in the presence of a strong acid.

Such solvents include alcohols, e.g. ethanol, butanol, benzyl alcohol, nitriles, e.g. acetonitrile and propionitrile, organic carboxylic acids, e.g. acetic acid, acid anhydrides, e.g. acetic anhydride, and alicyclic ethers, e.g. dioxane and tetrahydrofuran. A mixture of an aromatic hydrocarbon such as benzene with butanol, benzyl alcohol, or the like can also be used as the solvent. The reaction temperature ranges from room temperature to the boiling point of the solvent.

Examples of preparation processes are given below referring to typical azulenium salts used in the invention.

Preparation Example 1 (Compound No. 1)

A mixture of hydroiodic acid (28.2 g) and tetrahydrofuran (100 ml) was added dropwise to a solution of p-dimethylaminobenzaldehyde (6.47 g) and 1,4-dimethyl-7-isopropylazulene (8.60 g) in tetrahydrofuran (200 ml) with stirring at room temperature. After 3 hours' stirring, the mixture was allowed to stand overnight. The resulting precipitate was filtered, and washed in turn twice with tetrahydrofuran (50 ml×2), twice with water (300 ml×2), and once with tetrahydrofuran (50 ml), by repeating suspension-filtration. Then drying the washed solid gave compound No. 1 (11.5 g), yield 58%.

Absorption spectrum in dichloromethane: λmax=651 nm, ε=1.12×10$^5$

Analysis, Calcd.(%) for C$_{24}$H$_{28}$NI: C, 63.01; H, 6.18; N, 3.06; I, 27.74. Found(%): C, 62.94; H, 6.22; N, 3.12; I, 27.69.

Preparation Example 2 (Compound No. 7)

Hydroiodic acid (10.45 g) was added dropwise to a solution of p-dimethylaminocinnamaldehyde (2.70 g) and 1,4-dimethyl-7-isopropylazulene (3.06 g) in tetrahydrofuran (72 ml) with stirring at room temperature. After 3 hours' stirring, the formed precipitate was filtered, and washed in turn twice with tetrahydrofuran (50 ml×2), twice with water (100 ml×2), and twice with ethanol (40 ml×2), by repeating suspension-filtration. Then drying the washed solid gave compound No. 7 (4.8 g), yield 64.4%.

Absorption spectrum in dichloromethane: λmax=728 nm, ε=1.69×10$^5$

Melting point: 185°–187° C. (capillary method)

Analysis, Calcd.(%) for C$_{26}$H$_{30}$NI: C, 64.59; H, 6.27; N, 2.90; I, 26.25. Found(%): C, 64.28; H, 6.21; N, 2.86; I, 26.17.

Reference Preparation Example (Compound having the same structure as compound No. 7 but ClO$^-$ in place of I$^-$)

p-Dimethylaminocinnamaldehyde (1.77 g) and guaiazulene (2 g) (G1100-4, supplied by Aldrich Chem. Co.) were dissolved in acetic acid (50 ml), and heated to 103° C. After addition of 70% perchloric acid (10 ml), the mixture was heated at 103°–106° C. with stirring for 20 minutes, and then cooled. This reaction mixture was left standing overnight, and the formed precipitate was filtered, and washed in turn three times with acetic acid (50 ml×3), twice with water (250 ml×2), and twice with ethanol (250 ml×2), by repeating suspension-filtration. Then drying the washed solid gave the title compound (1.88 g), yield 40.9%.

Absorption spectra in dichloromethane: λmax=728 nm

Analysis, Calcd.(%) for C$_{26}$H$_{30}$ClNO$_4$: C, 68.48; H, 6.64; N, 3.07; Cl, 7.77. Found(%): C, 68.57; H, 6.73; N, 3.14; Cl, 7.64.

Films comprising the above azulenium salt exhibit panchromatic photoconductivity and therefore can be favorably used as photosensitive layers of electrophotographic photosensitive members. That is, in embodiments of the invention, electrophotographic photosensitive members can be prepared by vacuum deposition of the azulenium salt compound on an electroconductive substrate or by coating a dispersion of the salt in a suitable binder solution on an electroconductive substrate, to form films.

In preferred embodiments of the invention, the thus prepared photoconductive film can be used as a charge generation layer for the electrophotographic photosensitive member which has two photosensitive layers functioning separately as a charge generation layer and a charge transport layer.

The charge generation layer is desired to contain said photoconductive compound as much as possible for the purpose of absorbing a sufficient quantity of light and is also desired to be as thin as, for example, 5μ or less, preferably 0.01 to 1μ, for the purpose of shortening the minimum distance necessary for generated charge carries to reach the charge transport layer. This is because the charge generation layer needs to absorb the most part of the incident light and generate many charge carriers and additionally the generated charge carriers need to be injected into the charge transport layer without being deactivated by recombination or trapping.

The charge generation layer can be formed, as stated above, by applying a suitable binder solution in which the azulenium salt has been dispersed on a substrate or by vapor deposition of the salt on a substrate using a vacuum deposition apparatus. The binder used to form the charge generation layer can be selected from a wide variety of insulating resins and also from organic photoconductive polymers such as poly-(N-vinylcarbazole), polyvinylanthracene, and polyvinylpyrene. Preferred examples of the binder are insulating resins such as poly(vinylbutyral), polyacrylate (e.g. a polycondensation product of bisphenol A with phthalic acid), polycarbonate, polyester, phenoxy resin, poly(vinylacetate), acrylic resin, polyacrylamide resin, polyamide, polyvinylpyridine, cellulosic resin, urethane resin, epoxy resin, casein, poly(vinylalcohol), and polyvinylpyrrolidone. The resin content in the charge generation layer is desirably up to 80%, preferably up to 40%, by weight.

The solvent to dissolve the binder resin varies depending on the species of the resin and is desirably chosen from those dissolving neither the charge transport layer nor the under coating layer, said layers being described later. Generally suitable examples of the solvent are; alcohols such as methanol, ethanol, and isopropanol; ketones such as acetone, methyl ethyl ketone, and cyclohexanone; amides such as N,N-dimethylformamide and N,N-dimethylacetamide; sulfoxides such as dimethylsulfoxide; ethers such as tetrahydrofuran, dioxane, and ethylene glycol monomethyl ether; esters such as methyl acetate and ethyl acetate; halogenated aliphatic hydrocarbons such as chloroform, methylene chloride, dichloroethylene, carbon tetrachloride, and trichloroethylene; and aromatic hydrocarbon or chlorinated derivatives thereof such as benzene, toluene, xylene, ligroin, monochlorobenzene, and dichlorobenzene.

The coating can be carried out by dip coating, spray coating, spinner coating, bead coating, Meyer bar coating, blade coating, roller coating, curtain coating, etc. The drying is better carried out by heating after set to touch at room temperature. This drying with heat may be accomplished at a temperature of 30° to 200° C. for a period of 5 minutes to 2 hours with or without flowing air.

The charge transport layer, being in electrical connection with the charge generation layer, has functions of receiving charge carriers from the charge generation layer in an electric field and transporting them to the surface. This charge transport layer may be laid on the upper side (opposite side with respect to the substrate) or lower side of the charge generation layer, but generally on the upper side.

The substance which transports charge carriers in the charge transport layer (hereinafter this substance is referred to as the charge-transporting material) is desired to be substantially non-responsive to the electromagnetic waves to which the charge generation layer is responsive. The term "electromagnetic waves" used herein means the light in a broad sense including γ-rays, X-rays, ultraviolet rays, visible rays, near infrared rays, infrared rays, far infrared rays, etc.

The charge-transporting materials are classified into electron-transporting materials and hole-transporting materials. The electron transporting materials include electron attractive substances such as chloranil, bromanil, tetracyanoethylene, tetracyanoquinodimethane, 2,4,7-trinitro-9-fluorenone, 2,4,5,7-tetranitro-9-fluorenone, 2,4,7-trinitro-9-dicyanomethylenefluorenone, 2,4,5,7-tetranitroxanthone, and 2,4,8-trinitrothioxanthone and polymerization products of these electron attractive substances.

The hole-transporting materials include pyrene, N-ethylcarbazole, N-isopropylcarbazole, N-methyl-N-phenylhydrazino-3-methylidene-9-ethylcarbazole, N,N-diphenylhydrazino-3-methylidene-9-ethylcarbazole, N,N-diphenylhydrazino-3-methylidene-10-ethylphenothiazine, N,N-diphenylhydrazino-3-methylidene-10-ethylphenoxazine; hydrazones such as p-diethylanimobenzaldehyde-N,N-diphenylhydrazone, p-diethylaminobenzaldehyde-N-α-naphthyl-N-phenylhydrazone, p-pyrrolidinobenzaldehyde-N,N-diphenylhydrazone, 1,3,3-trimethylindolenine-ω-aldehyde-N,N-diphenylhydrazone, and p-diethylbenzaldehyde-3-methylbenzthiazolinone-2-hydrazone; 2,5-bis(p-diethylaminophenyl)-1,3,4-oxadiazole; pyrazolines such as 1-phenyl-3-(p-diethylaminostyral)-5-(p-diethylaminophenyl)pyrazoline, 1-[quinolyl(2)]-3-(p-diethylaminostyryl)-5-(p-diethylaminophenyl)-pyrazoline, 1-[pyridyl(2)]-3-(p-diethylaminostyryl)-5-(p-diethylaminopheny)pyrazoline, 1-[6-methoxypyridyl(2)]-3-(p-diethylaminostyryl)-5-(p-diethylaminophenyl)-pyrazoline, 1-[pyridyl(3)]-3-(p-diethylaminostyryl)-5-(p-diethylaminophenyl)pyrazoline, 1-[lepidyl(2)]-3-(p-diethylaminostyryl)-5-(p-diethylaminophenyl)pyrazoline, 1-[pyridyl(2)]-3-(p-diethylaminostyryl)-4-methyl-5-(p-diethylaminophenyl)pyrazoline, 1-[pyridyl(2)]-3-(α-methyl-p-diethylaminostyryl)-5-(p-diethylaminophenyl)pyrazoline, 1-phenyl-3-(p-diethylaminostyryl)-4-methyl-5-(p-diethylaminophenyl)pyrazoline, 1-phenyl-3-(α-benzyl-p-diethylaminostyryl)-5-(p-diethylaminophenyl)pyrazoline, and spiropyrazoline; oxazole compounds such as 2-(p-diethylaminostyryl)-6-diethylaminobenzoxazole and 2-(p-diethylaminophenyl)-4-(p-dimethylaminophenyl)-5-(2-chlorophenyl)oxazple; thiazole compounds such as 2-(p-diethylaminostyryl)-6-diethylaminobenzothiazole; triarylmethane compounds such as bis(4-diethylamino-2-methylphenyl)phenylmethane; polyarylalkanes such as 1,1-bis(4-N,N-diethylamino-2-methylphenyl)-heptane and 1,1,2,2-tetrakes(4-N,N-dimethylamino-2-methylphenyl)ethane; triphenylamine; poly(N-vinylcarbazole), polyvinylpyrene, polyvinylanthracene, polyvinylacridine, poly(9-vinylphenylanthracene), pyrene-formaldehyde resin, and ethylcarbazole-formaldehyde resin.

Besides these organic charge-transporting materials, there may be used inorganic materials such as selenium, selenium-tellurium, amorphous silicon, and cadmium sulfide.

These charge-transporting materials can be used alone or in combination.

Charge-transporting materials having no sufficient film-forming property can be formed into films by combining with suitable binders. Such binders include insulating resins, e.g. acrylic resin, polyacrylate, polyester, polycarbonate, polystyrene, acrylonitrile-styrene copolymer, acrylonitrile-butadiene copolymer, poly(vinyl butyral), poly(vinyl formal), polysulfone, polyacrylamide polyamide, and chlorinated rubber, and further organic photoconductive polymers, e.g. poly(N-vinylcarbazole), polyvinylanthracene, and polyvinylpyrene.

The thickness of the charge transport layer cannot be made larger than is necessary, since charge carriers cannot be transported therein farther than a definite range. The thickness ranges generally from 5 to 30μ, preferably from 8 to 20μ. When the charge transport layer is formed by coating, suitable coating methods as mentioned above can be applied.

The photosensitive layer consisting of the charge generation layer and the charge transport layer, described above, is formed on a conductive substrate having a conductive layer. Such conductive substrates include those haivng conductivity in themselves, such as aluminum, aluminum alloy, copper, zinc, stainless steel, vanadium, molybdenum, chromium, titanium, nickel, indium, gold, and platinum; those of plastics, e.g. polyethylene, polypropylene, poly(vinyl chloride), poly(ethylene terephthalate), acrylic resin, and polyfluoroethylene, which have a conductive layer formed by vacuum deposition of aluminum, aluminum alloy, indium oxide, tin oxide, indium oxide-tin oxide alloy, or the like; those of plastics coated with conductive particles, e.g. carbon black or silver particles, in combination with a suitable binder; those of plastics or paper impregnated with conductive particles; and those of plastics comprising a conductive polymer.

An under coating layer having a barrier function and a bonding function can be laid between the conductive substrate and the photosensitive layer. The under coating layer can be formed of casein, poly(vinyl alcohol), nitrocellulose, ethylene-acrylic acid copolymer, polyamide(nylon-6, nylon 66, nylon 610, copolymer nylon, or alkoxymethylated nylon), polyurethane, gelatin, or aluminum oxide.

The thickness of under coating layer is desirably 0.1–5μ, preferably 0.5–3μ.

For operating the photosensitive member comprising a conductive layer, charge generation layer, and charge transport layer laminated in that order, the surface of the charge transport layer needs to be positively charged when the charge transporting meterial is an electron-transporting material. On image exposure of the photosensitive member after charging, electrons liberated in the charge generation layer, in the exposed portions, are injected into the transport layer, then arrive at the surface, and neutralize the positive charge to decay the surface potential, thus forming an electrostatic contrast between the exposed portions and the unexposed portions. This electrostatic latent image, on development with a negatively chargeable toner, turns into a visible image, which can be fixed directly or after being transferred onto paper of a plastic film.

Alternatively, the electrostatic latent image on the photosensitive member can be transferred onto the insulation layer of a transfer paper, and then developed and fixed. Any known developing agent, development process, and fixing process may be adopted; there are none of particular restrictions on the material and the processes.

On the other hand, when the charge-transporting material is hole-transporting material, the surface of the charge transport layer needs to be negatively charged. On image exposure of the photosensitive member after charging, holes produced in the charge generation layer, in the exposed portions, are injected into the charge transport layer, then arrive at the surface, and neutralize the negative charge to decay the surface potential, thus forming an electrostatic contrast between the exposed portions and the unexposed portions.

For developing this, it is necessary to use a positively chargeable toner contrary to the case where an electron-transporting material is used.

In another embodiment of the invention, the azulenium salt can be used as a sensitizer for the above cited organic photoconductive materials such as hydrazones, pyrazolines, oxazoles, thiazoles, triarylmethanes, polyarylalkanes, triphenylamine, poly(n-vinylcarbazole) and other photoconductive polymers and inorganic photoconductive materials such as zinc oxide, cadmium sulfide, and selenium, to form photosensitive films. These photosensitive films are formed by applying mixtures of the photoconductive material, the azulenium salt, and a suitable binder solution.

Any photosensitive member according to the invention contains at least one selected from the azulenium salts represented by the formula (1), and if necessary, a photoconductive pigment or dye different from the azulenium salt in light absorption spectra.

As shown in FIG. 1, the photoconductive film of the invention has broad spectral sensitivity, and therefore is suited for use in photosensitive members of color copying machines and of laser beam printers.

The invention is illustrated with reference to the following examples.

EXAMPLE 1

A solution of casein in aqueous ammonia (casein 11.2 g, 28% aqueous ammonia 1 g, water 222 ml) was applied on an aluminum sheet by means of a Meyer bar so as to give a dry thickness of $1.0\mu$, and was dried.

A coating composition was prepared by adding 5 g of the above listed azulenium salt compound No. 7 to a solution of 2 g of a butyral resin (degree of butyral conversion 63 mole%) in 95 ml of isopropanol.

This composition, dispersed by using an attritor, was applied on the casein under coating layer by means of a Meyer bar so as to give a dry thickness of $0.1\mu$, and was dried, forming a charge generation layer.

Then, 5 g of the hydrazone compound of the formula

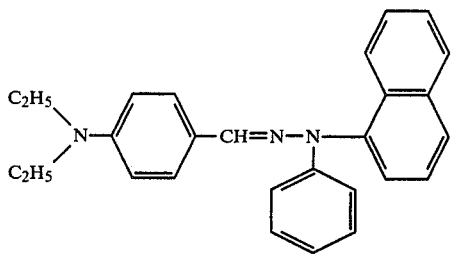

and 5 g of a poly(methyl methacrylate) resin (number average molecular weight 100,000) were dissolved in 70 ml of benzene This solution was applied on the charge generation layer by means of a Meyer bar so as to give a dry thickness of $12\mu$, and was dried, forming a charge transport layer.

The thus prepared photosensitive member was coronacharged at $-5$ kV in the static fashion by using an electrostatic copying paper testing machine (Model.SP-428, mfd. by Kawaguchi Denki Co., Ltd.), retained for 10 seconds in the dark, and exposed to a halogen lamp through interference filters of respective transmission wavelengths 4510, 4760, 4990, 5500, 5620, 6020, 6530, 7220, 7780, 8020, 8270, 8540, and 9000 Å to measure exposure quanties ($\mu J/cm^2$) for decaying the 10-second dark decayed potential to $\frac{1}{4}$. Results of the measurement are shown by curve 1 in FIG. 1.

EXAMPLE 2

A photosensitive member was prepared and measured for charge bearing characteristics in the same manner as in Example 1 but substituting the azulenium salt compound No. 1 for No. 7, giving similar results.

COMPARATIVE EXAMPLE 1

A photosensitive member was prepared and tested in the same manner as in Example 1 but substituting the azulenium salt prepared in the above Reference Preparation Example for the azulenium salt compound No. 7. Results of the test are shown by curve 2 in FIG. 1.

EXAMPLE 3

10 g of a fine powder of zinc oxide (tradename: Sazex 2000, mfd. by Sakai Kagaku Co., Ltd.), 4 g of an acrylic resin (tradename: Dianal LR009, mfd. by Mitsubishi Rayon Co., Ltd), 10 g of toluene, and 10 mg of the azulenium salt compound No. 7 were thoroughly mixed in a ball mill. The resulting coating liquid was applied by means of a doctor blade on an aluminum layer vapor deposited on a poly(ethyleneterephthalate) film, so as to give a dry thickness of $21\mu$, and was dried, thus preparing a photosensitive member.

The spectral sensitivity of this photosensitive member was determined by electrophotographic spectrophotometry. Therefrom it has been proved that this photosensitive member is better in panchromatic sensitivity than a zinc oxide film which does not contain the azulenium salt of this invention.

EXAMPLES 4-12

A poly(vinyl alcohol) film $1.0\mu$ thick was formed on an aluminum layer deposited on a poly(ethylene terephthalate) film.

Each of the compounds shown in Table 1 was added to a solution of 2 g of a butyral resin (degree of butyral conversion 63 mole%) in 95 ml of isopropanol to prepare a coating liquid. This coating liquid, dispersed in an attritor, was applied on the poly(vinyl alcohol) film by means of a Meyer bar so as to give a dry thickness of $0.1\mu$, and was dried, forming a charge generation layer.

Then, 5 g of the pyrazoline compound of the formula

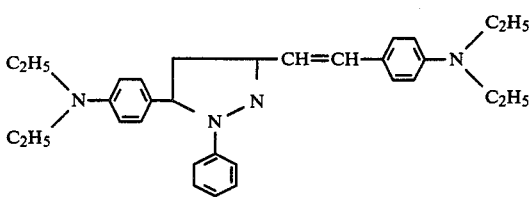

and 5 g of a polyacrylate resin (polycondensation copolymer of bisphenil A with a terephthalic acid-isophthalic acid mixture) were dissolved in 70 ml of tetrahydrofuran. The resulting solution was applied on the charge generation layer so as to give a dry thickness of $10\mu$, and was dried, forming a charge transport layer.

Photosensitive members prepared in this manner using all the azulenium salts shown in Table 1 were tested for charge bearing characteristics in the same fashion as in Example 1. Transmission wavelengths of interference filters used were 4760, 5500, 6530, and 8020 Å. Results of the tests are shown in Table 1.

TABLE 1

| Example No. | Azulenium salt compound No. | $E_{\frac{1}{2}}$ ($\mu J/cm^2$) at wavelength | | | |
|---|---|---|---|---|---|
| | | 4760Å | 5500Å | 6530Å | 8020Å |
| 4 | 1 | 3.7 | 3.0 | 2.8 | 3.4 |
| 5 | 2 | 5.3 | 3.7 | 3.4 | 4.6 |
| 6 | 3 | 4.6 | 3.5 | 3.7 | 3.9 |
| 7 | 4 | 3.2 | 3.5 | 2.8 | 3.1 |
| 8 | 5 | 3.1 | 3.6 | 3.0 | 2.8 |
| 9 | 6 | 4.8 | 4.3 | 4.0 | 3.5 |
| 10 | 8 | 2.4 | 2.1 | 1.8 | 1.5 |
| 11 | 9 | 3.2 | 3.0 | 2.7 | 2.0 |
| 12 | 10 | 2.8 | 2.7 | 2.7 | 2.4 |

What is claimed is:

1. A photoconductive film comprising an azulenium salt represented by the general formula (1)

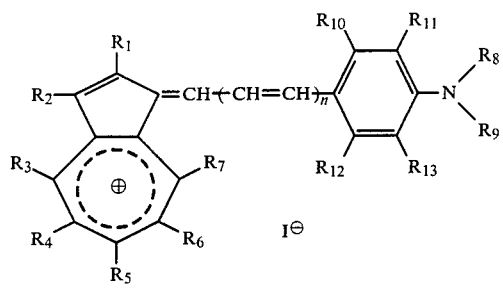

wherein $R_1$, $R_2$, $R_3$, $R_4$, $R_5$, $R_6$, and $R_7$ are each independently hydrogen, halo or a monovalent organic residue; or at least one of the combinations of $R_1$ with $R_2$, $R_3$ with $R_4$, $R_4$ with $R_5$, $R_5$ with $R_6$, and $R_6$ with $R_7$ may form an unsubstituted or substituted aromatic ring; $RA_8$ and $R_9$ are each independently unsubstituted or substituted alkyl, aryl, or aralkyl; or $R_8$ and $R_9$, together with the nitrogen atom to which they are attached, may be joined to form an aromatic ring; $R_{10}$, $R_{11}$, $R_{12}$, and $R_{13}$ are each independently hydrogen, halo, alkyl, alkoxy, or hydroxyl; and n is 0, 1, or 2.

2. The photoconductive film of claim 1, which comprises an azulenium salt represented by the general foumula (1) and a binder.

3. The photoconductive film of claim 1, which comprises a vapor deposition film of an azulenium salt represented by the general formula (1).

4. The photoconductive film of claim 1, wherein the azulenium salt represented by the general formula (1) is any of the compounds of the following formulae (1)–(17).

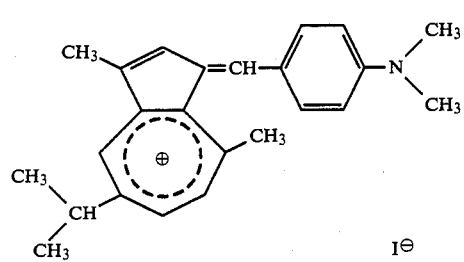
(1)

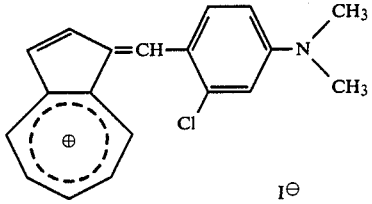
(2)

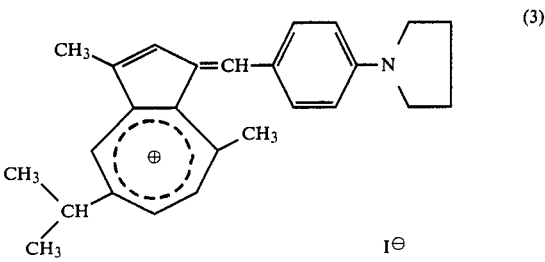
(3)

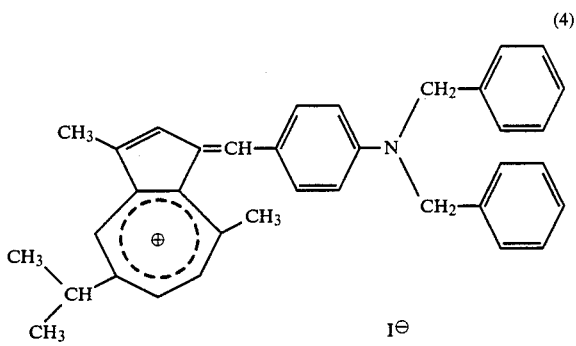
(4)

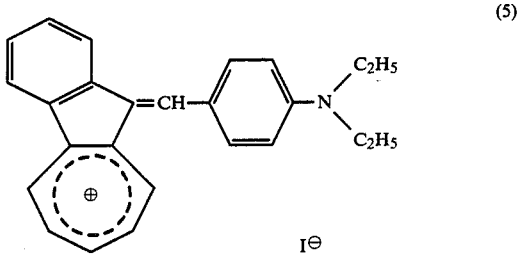
(5)

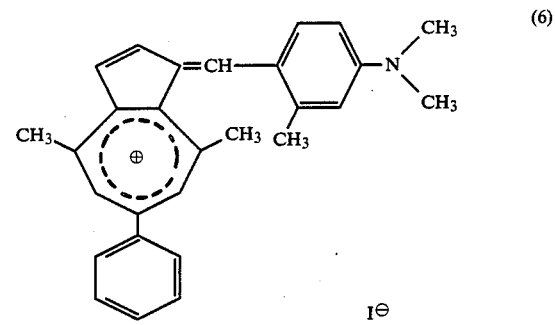
(6)

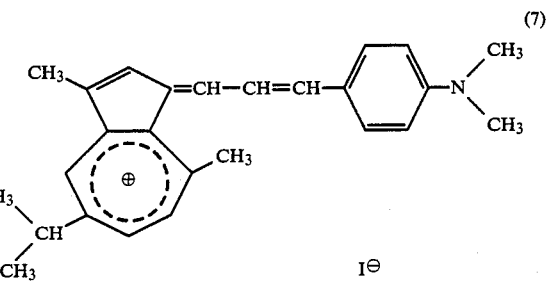
(7)

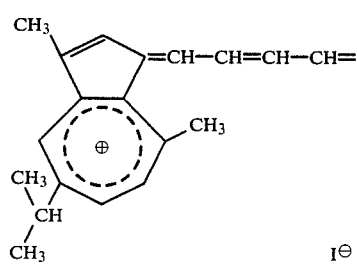
(8)
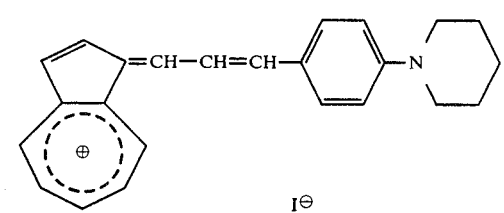
(9)
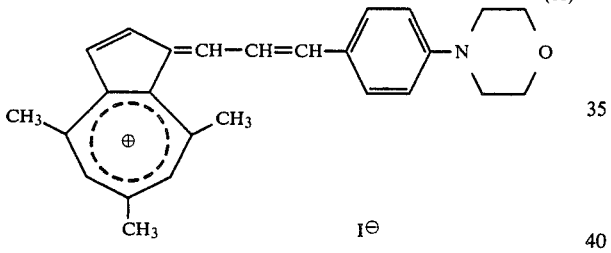
(10)
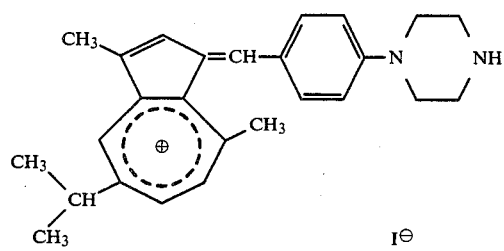
(11)
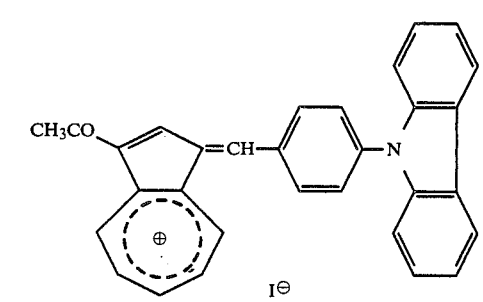
(12)
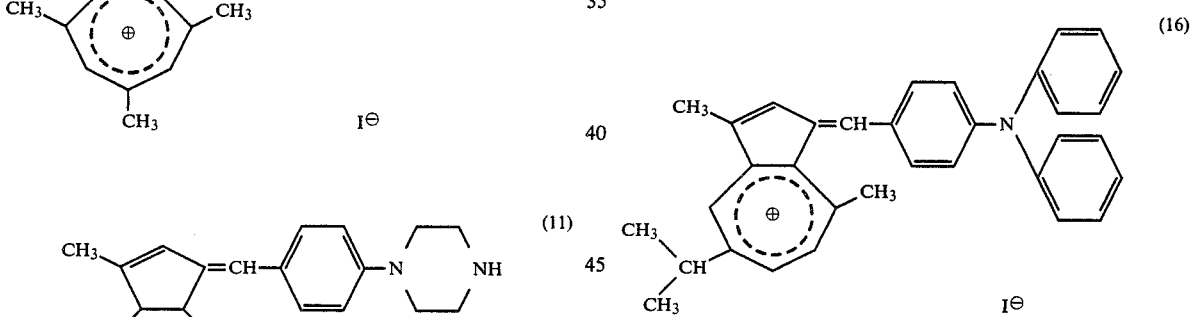
(13)
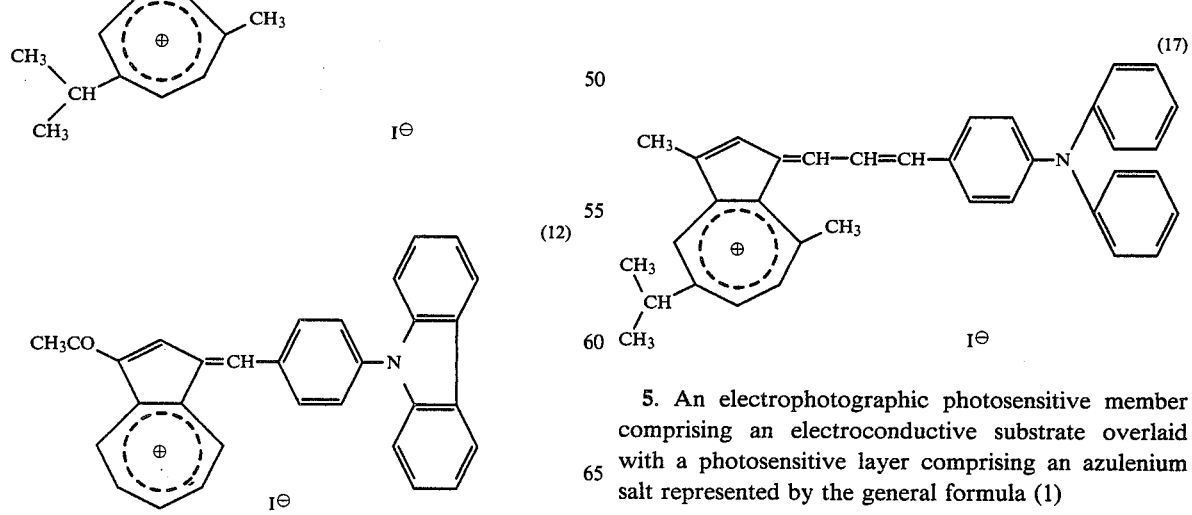
(14)
(15)
(16)
(17)
5. An electrophotographic photosensitive member comprising an electroconductive substrate overlaid with a photosensitive layer comprising an azulenium salt represented by the general formula (1)

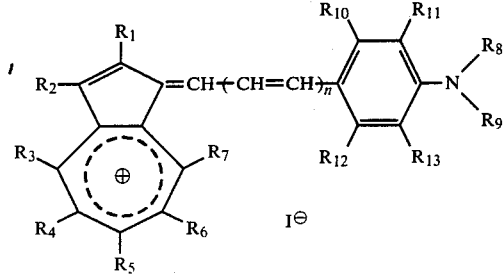

wherein $R_1$, $R_2$, $R_3$, $R_4$, $R_5$, $R_6$, and $R_7$ are each independently hydrogen, halo or a monovalent organic residue; or at least one of the combinations of $R_1$ with $R_2$, $R_3$ with $R_4$, $R_4$ with $R_5$, $R_5$ with $R_6$, and $R_6$ with $R_7$ may form an unsubstituted or substituted aromatic ring; $R_8$ and $R_9$ are each independently unsubstituted or substituted alkyl, aryl, or aralkyl; or $R_8$ and $R_9$, together with the nitrogen atom to which they are attached, may be joined to form an aromatic ring; $R_{10}$, $R_{11}$, $R_{12}$, and $R_{13}$ are each independently hydrogen, halo, alkyl, alkoxy, or hydroxyl; and n is 0, 1, or 2.

6. The electrophotographic photosensitive member of claim 5, where the photosensitive layer comprises an azulenium salt represented by the general formula (1) and a binder.

7. The electrophotographic photosensitive member of claim 5, wherein the photosensitive layer is formed of a vapor deposition film of an azulenium salt represented by the general formula (1).

8. The electrophotographic photosensitive member of claim 5, wherein the photosensitive layer comprises a charge generation layer and a charge transport layer and the charge generation layer contains an azulenium salt represented by the general formula (1).

9. The electrophotographic photosensitive member of claim 8, wherein the charge generation layer is laid on the upper side of the charge transport layer.

10. The electrophotographic photosensitive member of claim 5, wherein the photosensitive layer contains an organic photoconductive substance sensitized by an azulenium salt represented by the general formula (1).

11. The electrophotographic photosensitive member of claim 5, wherein the photosensitive layer contains an inorganic photoconductive substance sensitized by an azulenium salt represented by the general formula (1).

12. The electrophotographic photosensitive member of claim 5, which has an under coating layer between the electroconductive substrate and the photosensitive layer.

13. The electrophotographic photosensitive member of claim 5, which is for use in color copying machines.

14. The electrophotographic photosensitive member of claim 5, which is for use in laser beam printers.

* * * * *

UNITED STATES PATENT AND TRADEMARK OFFICE
CERTIFICATE OF CORRECTION

PATENT NO. : 4,579,799

DATED : April 1, 1986

INVENTOR(S) : KAZUHARU KATAGIRI, ET AL.

It is certified that error appears in the above-identified patent and that said Letters Patent is hereby corrected as shown below:

COLUMN 13

Line 39, "$RA_8$" should read --$R_8$--.

Line 48, "foumula" should read --formula--.

Signed and Sealed this

Twenty-fourth Day of March, 1987

Attest:

DONALD J. QUIGG

Attesting Officer      Commissioner of Patents and Trademarks